United States Patent [19]

Nose et al.

[11] Patent Number: 4,985,186

[45] Date of Patent: Jan. 15, 1991

[54] PROCESS FOR PRODUCING OPTICAL ELEMENT

[75] Inventors: Noriyuki Nose, Sagamihara; Toshiyuki Nakajima, Atsugi; Eigo Kawakami, Atsugi; Takeshi Baba, Atsugi; Nobuo Kushibiki, Ebina; Masakazu Matsugu; Yukichi Niwa, both of Atsugi, all of Japan

[73] Assignee: Canon Kabushiki Kaisha, Tokyo, Japan

[21] Appl. No.: 35,773

[22] Filed: Apr. 8, 1987

[30] Foreign Application Priority Data

Apr. 11, 1986 [JP] Japan .................................. 61-83761
Apr. 11, 1986 [JP] Japan .................................. 61-83764
May 1, 1986 [JP] Japan .................................. 61-99490

[51] Int. Cl.$^5$ ........................................... B29D 11/00
[52] U.S. Cl. ..................................... 264/1.7; 264/1.1; 264/2.3; 264/101; 264/316; 264/335; 425/437; 425/808
[58] Field of Search ............... 264/1.1, 1.7, 2.3, 335, 264/255, 1.8, 2.5, 101, 316; 425/808, 437

[56] References Cited

U.S. PATENT DOCUMENTS

| | | | |
|---|---|---|---|
| 3,529,458 | 9/1970 | Butler et al. | 425/437 |
| 4,038,014 | 7/1977 | Dusza et al. | 425/808 |
| 4,312,575 | 1/1982 | Peyman et al. | 264/1.7 |
| 4,385,025 | 5/1983 | Salerno et al. | 264/255 |
| 4,657,354 | 4/1987 | Kobayashi | 264/1.7 |

FOREIGN PATENT DOCUMENTS 121915 6/1986 Japan .................................. 425/437

*Primary Examiner*—James Lowe
*Attorney, Agent, or Firm*—Fitzpatrick, Cella, Harper & Scinto

[57] ABSTRACT

A process for producing an optical element wherein an optical molding is formed by using a mold and thereafter released from the mold by supplying a gas to the boundary between the mold surface and the optical molding. In the process, no localized external force is applied to the optical molding during the release thereof, and therefore undesirable deformation or flaws of the optical molding are not caused.

15 Claims, 7 Drawing Sheets

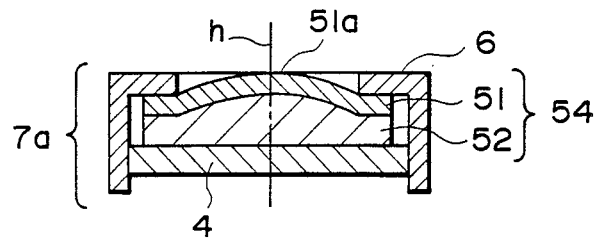
F I G. 6A
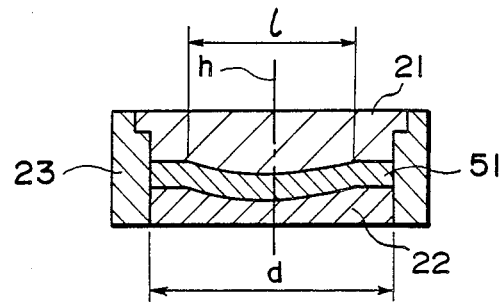
F I G. 6B
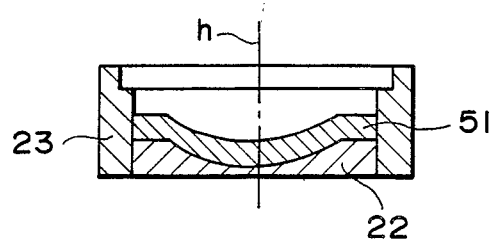
F I G. 6C
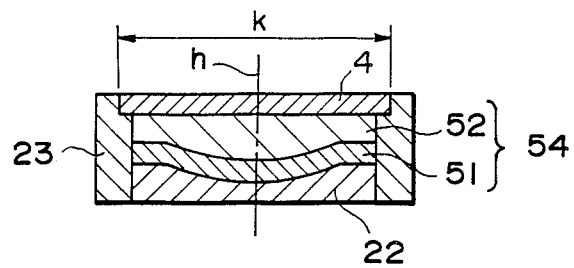
F I G. 6D

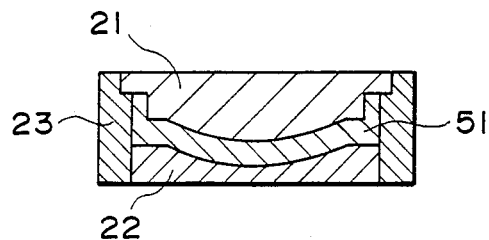
F I G. 8
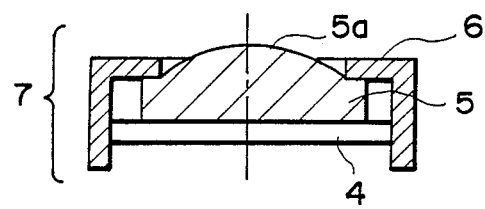
F I G. 9
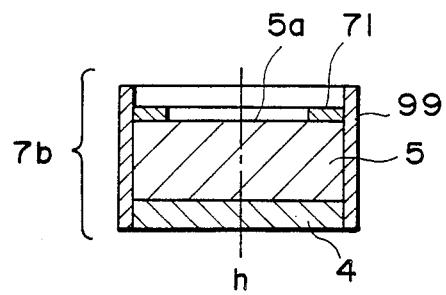
F I G. 10A
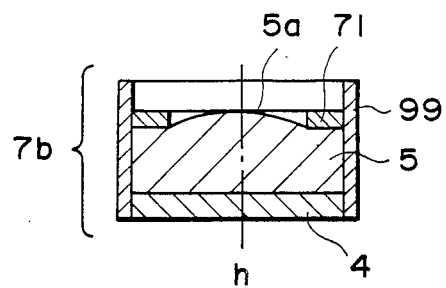
F I G. 10B

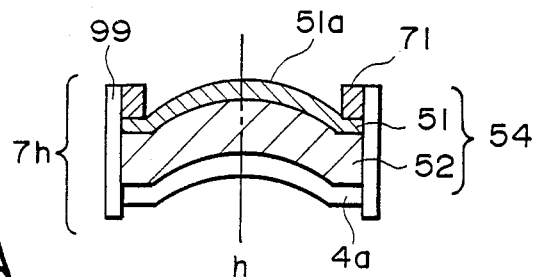
F I G. 16A
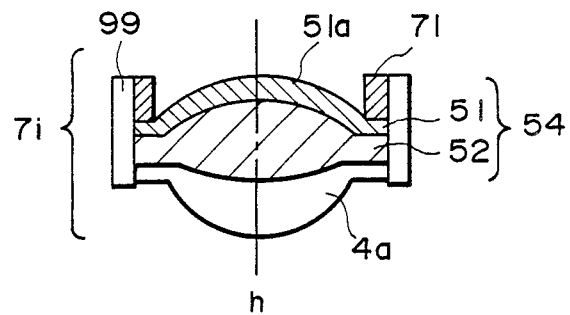
F I G. 16B
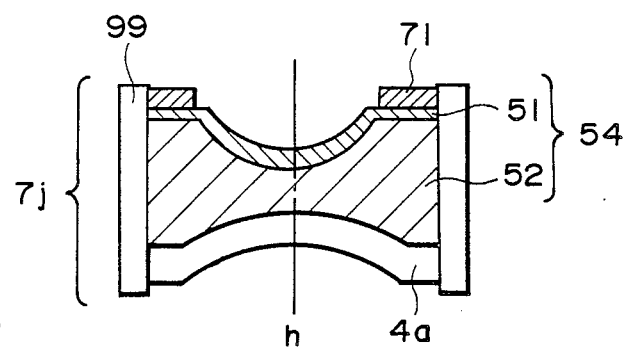
F I G. 16C
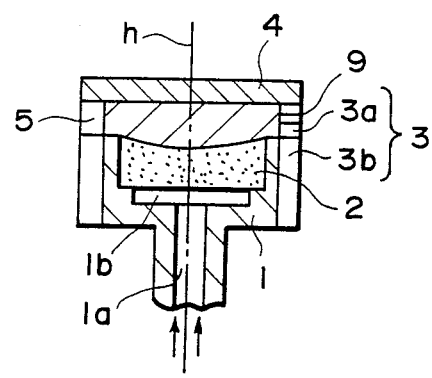
F I G. 17

4,985,186

PROCESS FOR PRODUCING OPTICAL ELEMENT

FIELD OF THE INVENTION AND RELATED ART

The present invention relates to a process for producing an optical element such as lens and prism, more specifically to a process for producing an optical element excellent in optical characteristics while maintaining molding precision.

Optical elements are applied to various optical instruments, optical communication instruments, electrooptical instruments, etc.

As processes for producing such optical elements, the glass mold method, the plastic replica method, the injection method, the compression method, etc., respectively using a mold, are ordinarily employed.

In order to obtain an optical element excellent in optical characteristics by using these methods, it is of course important to improve molding precision in the molding step. However, it is also extremely important to maintain molding precision in the releasing step. If it is not sufficient to maintain the molding precision in the releasing step, it is difficult to obtain an optical element excellent in molding precision.

Conventionally, in a process for producing an optical element, various methods have been used as those of releasing an optical molding (or a shaped product) comprising glass, resin, etc., from a mold.

Such conventional methods include: one wherein a V-shaped wedge is driven into a boundary between an optical molding and a method; one wherein a closely contacting combination of an optical molding and a mold is cooled by a blow of air, e.g., by means of an air gun, or the combination is dipped into hot water and cold water alternately, so as to change the temperature of the combination whereby the optical molding is released from the mold because of a difference in expansion or shrinkage therebetween; or one wherein an ultrasonic vibration is applied to an optical molding or a mold thereby to cause a release.

However, in the above method wherein a V-shaped wedge is driven into a boundary between an optical molding and a mold, optical characteristics of the optical molding are considerably impaired due to flaws arising on the optical surface thereof, or on a mold surface of the mold.

On the other hand, in the method wherein the combination of an optical molding and a mold is blown by air by means of an air gun, the release may be insufficient because of low cooling efficiency.

Further, in the method wherein the temperature of the combination is caused to change by using hot and cold water, it is required to repeat the heating and cooling operations until the release is ensured. Further, in this method, deformation of the optical surface of the optical molding is liable to occur due to thermal expansion or shrinkage thereof. Accordingly, this releasing method is not applicable to an optical modulation comprising a material capable of easily causing thermal deformation.

Further, in the method wherein ultrasonic vibration is used, it is required to apply the ultrasonic vibration to a mold or an optical molding repeatedly until the release is ensured. Therefore, the number of repetitions in the above operation may vary to some extent. Particularly, in a case where an optical molding comprising an elastomeric or elastic body is released from a mold, releasing effect is lowered since the ultrasonic vibration is absorbed by the elastomeric body. Therefore, in this case the temperature of the elastomeric body is elevated due to the absorption of the ultrasonic vibration, and thermal deformation of the elastomeric body is liable to occur.

SUMMARY OF THE INVENTION

A principal object of the present invention is to overcome the above drawbacks of the conventional processes and to provide a process for producing an optical element whereby an optical element is prepared with high precision by maintaining molding precision of an optical molding constituting the optical element.

According to the present invention, there is provided a process for producing an optical element utilizing a rigid holder comprising an optical molding, which comprises the steps of:
 pouring an uncured optical raw material into said holder having a rigid mold surface to form said optical element in contact with the mold surface and a porous material insert as part of the rigid mold surface, said porous material insert having a shape-defining rigidity; curing said optical raw material to thereby form said optical element in substantial contact with said mold surface; and
 supplying a gas through said porous material to the boundary between the optical element and the mold surface thereby to release the optical element from the mold.

In a second embodiment there is provided a process for producing an optical element utilizing a rigid holder which comprises the steps of:
 providing a holder having a rigid mold surface, a portion of said mold surface further including a porous material insert having shape-defining rigidity;
 disposing a film on at least a portion of said mold surface by applying negative air pressure through said porous material;
 pouring an uncured optical raw material into said holder having a rigid mold surface to form said optical element in contact with the mold surface and the film;
 curing said optical raw material to thereby form said optical element in substantial contact with said mold surface and said film; and
 removing the negative air pressure through said porous material to thereby release the optical element from the mold.

In the process for producing an optical element according to the present invention, the gas is directly supplied to the boundary (or contacting interface) between the mold and the optical molding, whereby a uniform release-promoting force is exerted over the surface of the optical molding due to the pressure of the gas. Accordingly, at the above boundary, the optical molding is so released from the mold as to be floated above the mold.

As a result, according to the present invention, it is possible to effect the release smoothly and surely, while minimizing the magnitude of an external force applied to the unit area of a surface of the optical molding. Thus, it is also possible to desirably maintain the molding precision of the optical molding, whereby an optical element comprising the released optical molding, and having high precision and excellent optical characteristics is obtained.

Further, according to the present invention, since the above release-promoting force is uniformly and directly applied to the surface of the optical molding, it is possible to effect the release smoothly and surely without depending on properties of the material constituting the optical molding to be released. Particularly, the process of the present invention is suitably applicable to release of an optical molding comprising an elastomeric or elastic body, which is difficult to release desirably by using the conventional releasing method. According to the present invention, deformation of the optical surface of such an optical molding, caused by thermal expansion or shrinkage or by absorption of ultrasonic vibration, is avoided thereby to effect the release smoothly and surely.

These and other objects, features and advantages of the present invention will become more apparent upon a consideration of the following description of the preferred embodiments of the present invention taken in conjunction with the accompanying drawings. In the following description, "%" and "parts" representing quantity ratios are by weight unless otherwise noted specifically.

BRIEF DESCRIPTION OF THE DRAWINGS

FIG. 6A is a sectional view showing another embodiment of an optical device produced according to the process of the present invention.

FIGS. 6B, 6C and 6D are sectional views illustrating an embodiment of the process according to the present invention for producing an optical device comprising a laminated elastomeric layer, in the order of steps.

FIG. 8 is a sectional view illustrating another embodiment of the process according to the present invention for forming a first elastomeric layer.

FIG. 9 is a sectional view showing a state wherein the bottom plate of the optical device shown in FIG. 3 is pressed.

FIGS. 10A to 16C are sectional views respectively showing an embodiment of the optical devices produced according to the process of the present invention.

FIG. 17 is a sectional view illustrating a process described in Example 1.

DETAILED DESCRIPTION OF THE PREFERRED EMBODIMENTS

An embodiment of the process according to the present invention wherein a variable-focus optical device comprising an elastomeric or elastic member is produced will be described hereinbelow, whereas the process according to the present invention is also applicable to production of optical elements or optical devices comprising glass, resin and the like.

Herein, an optical device refers to a device comprising an optical element and at least one other member. Further, a variable-focus optical device refers to an optical device capable of changing the focal length through deformation of an optical surface of an elastomeric member, which comprises: an elastomeric member and a relatively rigid member having an aperture and contacting the elastomeric member to expose a part of the surface of the elastomeric member through the aperture, the exposed surface part of the elastomeric member (hereinafter, referred to as "exposed surface") being changeable in shape through deformation of the elastomeric member to form a variable optical surface.

Figure 1:
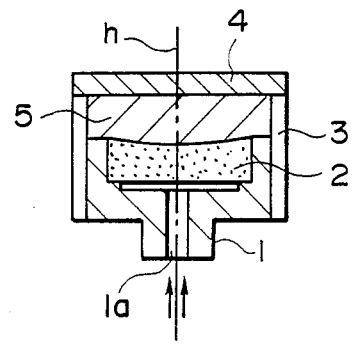
FIG. 1 is a sectional view illustrating an embodiment of the process according to the present invention.
Figure 2:
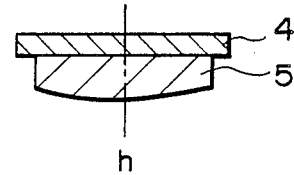
FIG. 2 is a sectional view showing an elastomeric member closely contacting a circular bottom plate.
Figure 3:
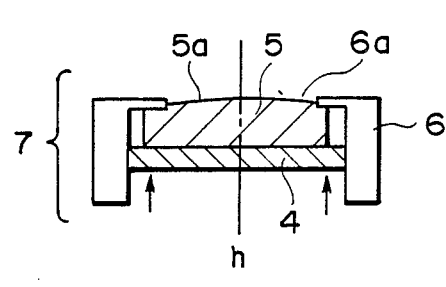
FIG. 3 is a sectional view showing an embodiment of an optical device produced according to the process of the present invention.

FIGS. 1 to 3 show an embodiment of the process for producing an optical device according to the present invention.

Referring to FIG. 1, in order to produce the above optical device, a holder 1 for accommodating a core, comprising metal, resin, etc., is provided first of all. The holder 1 has the shape of a body of revolution around an optical axis h, in which a gas inlet 1a is formed.

A columnar core or mold core 2 comprising a porous material of metal, glass, etc., is inserted in the holder 1. The core 2 has a mold surface (i.e., a surface capable of contacting an elastomeric member) of a desired shape.

A hollow cylindrical side mold 3 comprising metal, resin, etc., is disposed around the holder 1 thereby to contact the outer surface of the holder 1. Further, a circular bottom plate 4 comprising a transparent material such as glass or resin is disposed to confront the core 2 with a certain space therefrom.

Thus, the above core 2 (or holder 1), the side mold 3 and the bottom plate 4 forms a mold cavity. A raw material for an elastomeric member such as silicone is cast into the cavity through an inlet (not shown) formed in the side mold 3, and then the raw material is cured or hardened. As a result, an elastomeric member 5 as an optical molding, of a columnar shape around the optical axis h is formed (casting method).

Then, a gas such as air, after being pressurized, is injected through the inlet 1a of the holder 1, so that the gas passes through fine pores of the porous core 2, from a bottom surface (opposite to the mold surface) thereof. Thereafter, the gas reaches a boundary between the core 2 and the elastomeric member 5, thereby to provide a release-promoting force acting uniformly over the surface of the elastomeric member 5.

Based on the release-promoting force, the elastomeric member 5 is so released from the porous core 2 as to be floated above the core 2 while maintaining the molding precision of the elastomeric member 5. In this case, the holder 1 is simultaneously separated from the elastomeric member 5.

Thus, the released elastomeric member 5, after being separated from the side mold 3, is prepared in a state where it closely contacts the circular bottom plate 4 as shown in FIG. 2. The elastomeric member 5 is housed in an aperture member 6 (as shown in FIG. 3) having a circular aperture 6a and comprising a relatively rigid material such as metal or resin, whereby a variable-focus optical device 7 is prepared. In the optical device 7, the bottom plate 4 is disposed movably with respect to the aperture member 6 along the direction of an optical axis h.

Next, respective members shown in the FIGS. 1 to 3 will be described in more detail.

As a porous material constituting the core 2, there may be used, for example, glass such as Vycor (trade name), sintered alumina, ceramics such as silicon carbide, polymers such as polysulfone and polypropylene, etc. However, those capable of being readily released from the elastomeric member 5 are preferably used.

As these porous materials, one which is essentially porous may be used as such, or one wherein fine pores are formed through physical or chemical treatment may also be used.

The thickness of the porous core 2 along the optical axis h, while depending on the mechanical strength of the material thereof, is preferably 0.1 to 10 mm, more preferably 0.1 to 1.0 mm. Further, the pore diameter at the mold surface of the core 2 is preferably about 10 to 3000 Å, more preferably about 10 to 300 Å. If the above diameter exceeds 3000 Å, there can be caused a problem in roughness of an optical surface of the elastomeric member 5.

The gas permeability of the core 2 is preferably $5 \times 10^8$ mol/(cm$^2$·cmHg·min) or larger, in a case where a pressure difference of 5 kg/cm$^2$ is provided between the bottom surface of the core 2 and the mold surface, by using nitrogen gas at a temperature at which the release may be effected.

The area of the mold surface of the core 2 (i.e., a surface at which it contacts the elastomeric member 5) is preferably almost equal to, or larger than that of the exposed surface 5a of the elastomeric member 5. In order to exert the release-promoting force uniformly over the optical surface of the elastomeric member 5 (i.e., a surface at which it contacts the core mold 2), the above area of the mold surface may preferably be as large as possible.

The pressure of the gas injected from the bottom surface of the core 2 is preferably about 1 to 20 kg/cm$^2$ gauge in the vicinity of the bottom surface. Incidentally, it is sufficient to provide the gas to the boundary between the core 2 and the elastomeric member 5 through pores in the core 2. Accordingly, the gas can be injected to the boundary from the cylindrical outer surface of the columnar core 2.

In the above embodiment, the gas is directly injected to the surface of the elastomeric member 5 contacting the core 2 through the porous core 2. However, in the present invention, it is possible to insert a thin film 8 comprising, e.g., polyethylene between the elastomeric member 5 and the mold surface of the core 2, as shown in FIG. 4.

Figure 4:
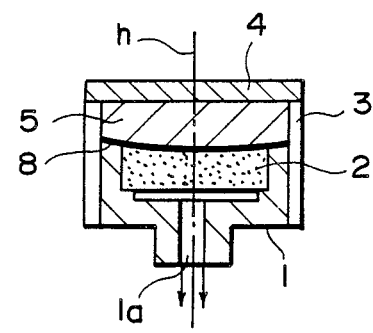
FIG. 4 is a sectional view illustrating another embodiment of the process according to the present invention.

In a case where the film 8 is inserted as shown in FIG. 4, even if the pore diameter at the mold surface of the core 2 is relatively large (more specifically, 1000 Å or larger, preferably several tens Å to several hundreds Å), it is easy to suppress the roughness of the optical surface of the elastomeric member 5 within an extent desired in view of the desired optical precision thereof.

In such an embodiment wherein the film 8 is inserted, it is possible to effect the release by injecting a gas such as air, through pressurization from the bottom surface of the core 2, similarly as the above embodiment shown in FIG. 1. In this embodiment shown in FIG. 4, however, it is preferable to effect the release according to a process comprising the steps of: connecting a suction means (not shown) to the gas inlet 1a of the holder 1; forming the elastomeric member 5 while applying a negative pressure to the film 8 covering the mold surface of the core 2 (i.e., while maintaining the core 2 in a state of reduced pressure); and thereafter, removing the negative pressure from the film 8 thereby to recover an ordinary pressure (or, injecting a gas under a slight pressure from the bottom surface of the core 2) and to effect the release.

When the negative pressure is removed from the film 8 in such a manner, a gas pressure exerted in a direction from the core 2 to the elastomeric member 5 is relatively increased from the state of forming the elastomeric member 5, similarly as in the case of FIG. 1, i.e., in the case of injecting the gas through pressurization. In a case where the release is effected by removing the negative pressure, it is possible to utilize a spontaneous deformation of the film 8 caused by a restoration force thereof, or to utilize the releasing effect of the film 8 on the elastomeric member 5, in combination with a release-promoting force based on increase in gas pressure. As a result, such releasing method is desirable in order to effect a smooth release of the elastomeric member 5 from the core 2.

The thickness of the film 8 is preferably about 0.1 $\mu$m to several tens $\mu$m, more preferably about 0.1 to 5.0 $\mu$m. It is preferred that the thickness of the film 8 is small as far as it retains a required strength.

As a material constituting the film 8, a material showing good releasability against the elastomeric member 5 is preferably used. More specifically, there are preferably used, e.g., a film comprising a polymer such as polyethylene, polyimide, polyacrylonitrile, polyvinylidene chloride.

It is more preferred that the surface of the film capable of contacting the elastomeric member 5 is preliminarily treated so as to improve the releasability thereof against the elastomeric member 5. Such treatment may include, for example, corona discharge treatment, glow discharge treatment, and a treatment using acid or base.

Hereinbelow, another embodiment of the process according to the present invention will be described with reference to FIGS. 5A, 5B and 5C.

Figure 5A:
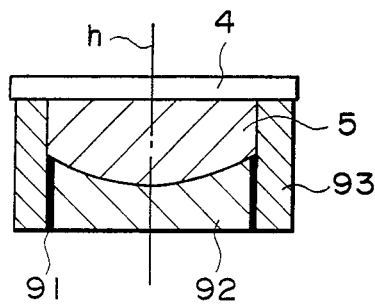
FIGS. 5A, 5B and 5C are sectional views for illustrating another embodiment of the process according to the present invention in the order of steps.

Referring to FIG. 5A, a fitting member 91 having the shape of, e.g., a pin or wedge is so inserted in a columnar lower mold 92 comprising metal, glass, etc., as to pass through the lower mold 92 from its mold surface to its bottom surface. A circular bottom plate 4 comprising a transparent material such as glass is disposed to confront the lower mold 92 with a certain space. Further, a cylindrical side mold 93 is so disposed around the lower mold 92 as to contact the outer surface thereof.

Into a mold cavity surrounded by the lower mold 92, the bottom plate 4, and the side mold 93, a raw material for an elastomeric member such as silicone is poured through an inlet (not shown) formed in the side mold 93. Thereafter, the raw material is cured or hardened, e.g., with a curing agent, thereby to form an elastomeric member 5 in a columnar shape around the optical axis h (casting method).

Figure 5B:
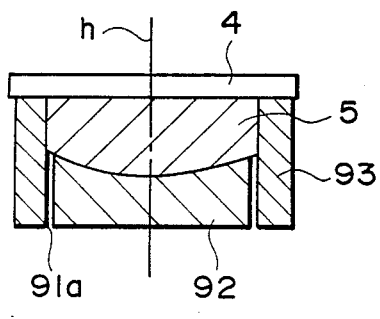

Then, as shown in FIG. 5B, by removing the fitting member 91 from the lower mold 92, there is formed a gas passage 91a extending from the bottom surface of the lower mold 92 to the mold surface thereof (i.e., a boundary between the lower mold 92 and the elastomeric member 5 formed above).

Figure 5C:
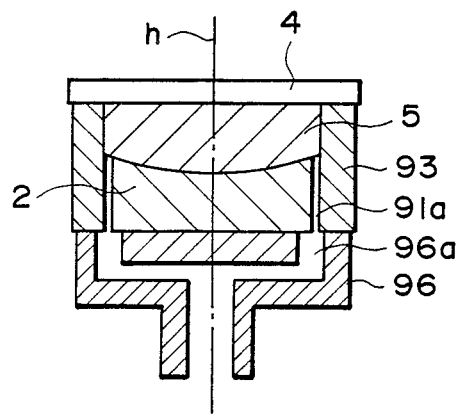

Further, as shown in FIG. 5C, a guide member 96 is so disposed on the bottom surface of the lower mold 2 as to connect a gas conduit 96a formed in the guide member 96 with the above gas passage 91a. Thereafter, a gas such as air under a pressure is injected through the gas conduit 96a.

The gas passes from the gas conduit 96a toward the gas passage 91a, and reaches the boundary between the lower mold 92 and the elastomeric member 5. As a result, the gas is rapidly diffused to fine gaps at the boundary between the lower mold 92 and the elastomeric member 5, and decreases the adhesion therebetween, thereby to promote the release therebetween.

In the embodiment shown in FIG. 5C, since the gas rapidly diffuses also to fine gaps at the boundary between the elastomeric member 5 and the side mold 93, the release of the elastomeric member 5 from the side mold 93 is also promoted.

Thus, the elastomeric member 5 is formed with high precision by suppressing the deformation of the elastomeric member 5 at the time of release. By using the thus formed elastomeric member 5, a variable-focus optical device 7 shown in FIG. 3 can be prepared.

Next, respective members shown in FIGS. 5A to 5C will be further described.

The lower mold 92 is a columnar member comprising metal such as brass or glass, and having a mold surface of a desired shape. The lower mold 92 is formed so as to fit the fitting member 91. Further, the gas passage 91a is so formed in the lower mold 92 as to extend from the mold surface to the bottom surface thereof.

It is possible to form the gas passage 91a so as to pass through the lower mold 92 in the central portion (i.e., in the vicinity of the optical axis h) thereof. However, it is preferred to form the gas passage 91a so as to pass through the lower mold 2 in a peripheral portion (i.e., in a portion close to the outer surface) thereof, in order to minimize the effect of the gas injection on the optical characteristics of the elastomeric member 5, or to readily exert the release-promoting force, based on the gas injection, also over the boundary between the elastomeric member 5 and the side mold 93.

Further, it is preferred to form plural gas passages 91a in order to uniformly exert the release-promoting force over the elastomeric member 5. Furthermore, the gas passage can have, e.g., a shape of cylindrical opening around the optical axis h.

While the shape of the gas passage 91a is not particularly limited, it is preferably a wedge-shaped one in which the sectional area thereof become relatively small on the side of the mold surface.

The fitting member 91 capable of being inserted into the above gas passage 91a may comprise metal, ceramics, plastic, etc., but preferably comprises similar material as the lower mold 92.

The pressure of the gas forcibly injected through the gas passage 91a, is preferably about 1 to 50 atm. gauge, more preferably about 5 to 20 atm. gauge, in the vicinity of the bottom surface of the lower mold 92.

When the gas is injected under pressure, the surface shape of the elastomeric member 5 can somewhat deform transiently. However, it is easy to suppress such transient deformation within a small amount of deformation, or within a range of elastic deformation, since the elastomeric member 5 is rapidly released from the lower mold 92 due to diffusion of the gas into the boundary therebetween. Accordingly, the elastomeric member 5 can rapidly recover from the above transient deformation. As a result, substantially no problem is caused with respect to the decrease in molding precision of the released elastomeric member 5 due to injection of the pressurized gas.

The side mold 93 constituting a mold for forming the elastomeric member 5 in combination with the above mentioned lower mold 92, may be a cylindrical member comprising a similar material as the lower mold 92. It is sufficient to form the gas passage 91a is at least one of the lower mold 92 and the side mold 93.

Hereinabove, there has been described an embodiment wherein the optical device 7 (FIG. 3) comprising a monolayer elastomeric member 5 is formed according to the present invention. It is also possible to form an optical device 7a comprising a laminate elastomeric member 54 shown in FIG. 6A according to the process of the present invention.

Referring to FIG. 6A, the laminate elastomeric member 54 comprises a first elastomeric layer 51 having a relatively large elasticity modulus, and a second elastomeric layer 52 having a relatively small elasticity modulus disposed on the first elastomeric layer 51 along an optical axis h, in that order from an exposed surface 51a of the elastomeric member 54.

In a case where the elastomeric member 54 comprises a first elastomeric layer 51 having a relatively large elasticity modulus, and a second elastomeric layer 52 having a relatively small elasticity modulus as shown in FIG. 6A, it is preferred to laminate the second elastomeric layer 52 having a relatively small elasticity modulus on the first elastomeric layer 51 having a relatively large elasticity modulus, as shown in FIG. 6B to 6D, thereby to prepare an optical device.

Referring to FIG. 6B, there is provided a mold comprising a columnar upper mold 21, a columnar lower mold 22 confronting the upper mold 21 with a certain space, and a cylindrical side mold 23 contacting the outer surfaces of the upper mold 21 and the lower mold 22.

In a first step, into a mold cavity surrounded by the above molds, a raw material for the first elastomeric layer 51 comprising e.g., silicone is poured and then cured to form the first elastomeric layer 51 having a relatively large elasticity modulus, as shown in FIG. 6B (casting method).

Then, as shown in FIG. 6C, the thus formed first elastomeric layer 51 is separated from the upper mold 21. In this step, as desired, the surface of the first elastomeric layer 51 from which the upper mold 21 has been separated, may be so treated as to enhance adhesion with the second elastomeric layer.

In a second step, as shown in FIG. 6D, a circular bottom plate 4, e.g., of glass is disposed on an upper portion (i.e., the portion from which the upper mold 21 has been removed) of the side mold 23 so that the bottom plate 4 and the above prepared first elastomeric layer 51 form a prescribed cavity. Into the cavity, a raw material for the second elastomeric layer 52 comprising, e.g., silicone is poured and then cured, e.g., with a curing agent thereby to form the second elastomeric layer 52 having a relatively small elasticity modulus which is laminated on the previously formed first elastomeric layer 51 along the optical axis h. As a result, a laminate elastomeric member 54 of a columnar shape is prepared.

In this case, the first elastomeric layer 51 previously formed, also functions as a part of the mold for forming the second elastomeric layer 52 to be laminated thereon. Since the first elastomeric layer 51 has a relatively large elasticity modulus, the amount of deformation thereof can be minimized even when the raw material for the second elastomeric layer 52 is poured. As a result, according to the above described process, the second elastomeric layer 52 having a relatively small elasticity modulus is also formed with good precision.

Thereafter, the thus formed laminate elastomeric member 54 is separated from the lower mold 22 and the side mold 23.

In the above described second step, when the raw material for the second elastomeric layer 52 is poured into the cavity surrounded by the first elastomeric layer 51 and the bottom plate 4 as shown in FIG. 6D, it is preferred to pour the raw material through an inlet formed in the side mold 23, or in a portion of the bottom plate 4 through which a light beam will not pass in use.

Referring to FIG. 6A, when the elasticity moduli of the first elastomeric layer 51 and the second elastomeric layer 52 are respectively denoted by $E_1$ and $E_2(N/m^2)$, and the thicknesses of the first and second elastomeric layers along the optical axis h are respectively denoted by $t_1$ and $t_2$(mm), in the embodiment shown in FIG. 6A, it is preferred that a relation $E_1 > E_2$ is satisfied and it is further preferred that a relation $t_1 \leq t_2$ is satisfied in a case of $E_1 > E_2$. In this case, if $t_1 > t_2$, an external force required for deformation of the laminate elastomeric member 54 is increased.

Further, in order to provide a laminate elastomeric member 54 comprising first and second elastomeric layers capable of maintaining the exposed surface 51a (i.e., the exposed surface part through the aperture of the aperture member (6) thereof to be almost spherical during deformation thereof, the following relation (1) is preferably satisfied.

$$5 < (E_1 \times t_1)/(E_2 \times t_2) < 100 \tag{1}$$

Furthermore, in a case where the optical device 7a is used as an ordinary lens, it is preferred that $t_1$ and $t_2$ generally satisfy a relation of $2 \leq t_1 + t_2 23\ 30$. The lower limit of the thickness of the first elastomeric layer 51 ($t_1$) is not particularly restricted. However, when $t_1$ is extremely small, the strength of the first elastomeric layer 51 can be insufficient, or it is liable to be wrinkled.

The first and second elastomeric layers 51 and 52 may be formed of similar materials, or of different materials. However, these elastomeric layers should preferably be formed of similar or the same type of materials such as silicone rubber, in order to readily form an optical device 7a with excellent optical characteristics because of a relatively small difference in refractive index therebetween, or in order to maintain a desirable adhesion therebetween.

It is not always required that the first or second elastomeric layer has a radially uniform thickness in the direction of the optical axis h. For example, it is possible to control the mode of deformation of the exposed surface 51a of the laminate elastomeric member 54, by giving a certain distribution to the thickness of the first elastomeric layer 51. In such a case, if the thickness of the first elastomeric layer 51 is relatively small in a central portion (i.e., in the vicinity of the optical axis h), and relatively large in a peripheral portion (i.e., in a portion distant from the optical axis h), the preferred range of the ratio $(E_1 \times t_1)/(E_2 \times t_2)$ shifts to smaller values than that shown in the above formula (1). On the other hand, if the thickness of the first elastomeric layer 51 is relatively large in a central portion and relatively small in a peripheral portion, the preferred range of the ratio $(E_1 \times t_1)/(E_2 \times t_2)$ shifts to larger values than that shown in the above formula (1).

Next, an embodiment of the present invention wherein a gas is injected to the boundary between the upper mold 21 and the first elastomeric layer 51 in a preparation of the laminate elastomeric member 54 will be described in more detail hereinbelow.

Figure 7A:
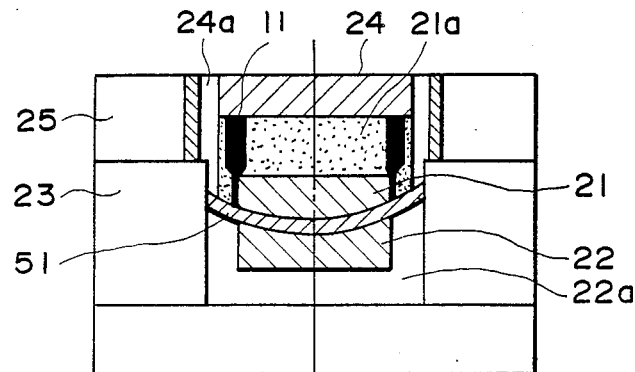
FIGS. 7A, 7B and 7C are sectional views illustrating an embodiment of the process according to the present invention for producing an optical device comprising a laminated elastomeric member wherein a gas is injected into a boundary between an upper mold and a first elastomeric layer, in the order of steps.

Referring to FIG. 7A, a columnar upper core 21 is held by a holder 21a and a columnar lower core 22 is held by a holder 22a. The upper core 21 confronts the lower core 22 with a certain space. A cylindrical side mold 23 is disposed so as to contact the outer surface of the columnar holder 22a. Further, a columnar guide member 24 for injection of raw material for an elastomeric member is disposed on the columnar holder 21a (on the surface thereof opposite to the surface confronting the upper core 21). Further, a cylindrical side mold 25 is disposed to contact the outer surface of the columnar guide member 24.

In the above mentioned upper core 21 and the holder 21a, a gas passage 11a is formed so as to extend from a bottom surface (i.e., the surface opposite to the surface confronting the upper core 21) of the holder 21a. Further, a fitting member 11 with a shape of, e.g., pin or wedge is inserted in the gas passage 11a.

The guide member 24 is disposed so as to form a passage extending from an inlet 24a (for injection of a raw material, formed therein) to a space between the holder 21a and the side mold 23, and to a cavity between the upper core 21 and the lower core 22. A raw material for a first elastomeric layer 51 such as silicone is poured through the inlet 24a into the cavity between the upper core 21 and the lower core 22, and then is cured, e.g., with a curing agent, thereby to form a first elastomeric layer 51.

Figure 7B:
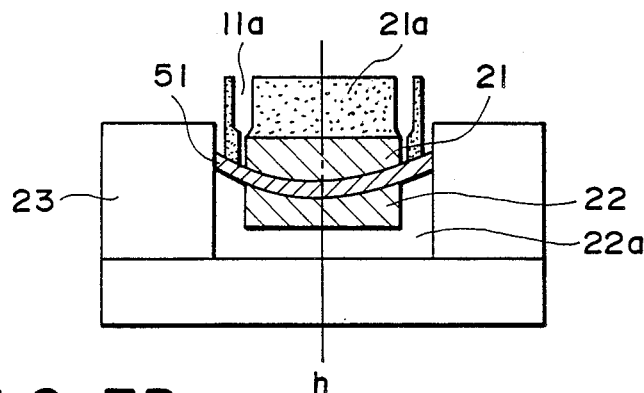

Then, as shown in FIG. 7B, after the separation of the guide member 24 and side mold 25, the fitting member 11 is removed from the upper core 21 and the holder 21a, whereby a gas passage 11a extending from the bottom surface of the holder 21a to a mold surface of the upper core 21 (i.e., the boundary between the upper core 21 and the first elastomeric layer 51) is formed.

Figure 7C:
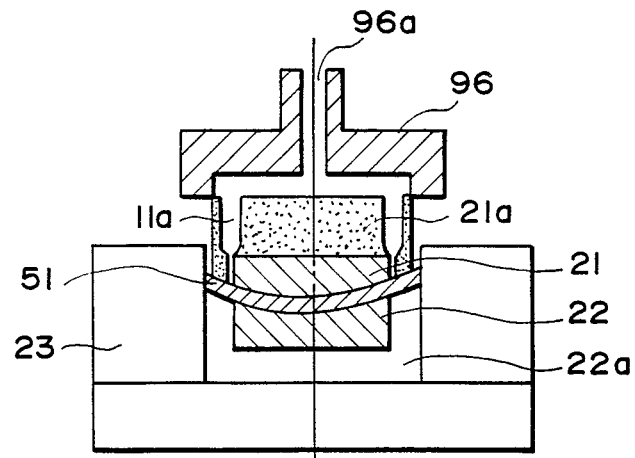

Further, as shown in FIG. 7C, a guide member 96 for gas injection is disposed on the bottom surface of the holder 21a so as to connect a gas conduit 96a formed therein to the above gas passage 11a. Through the gas conduit 96a, a gas such as air under pressure is injected, whereby the release at the boundary between the upper core 21 and the first elastomeric layer 51 is promoted due to the action of the gas, similarly as explained with reference to FIG. 5C.

After the first elastomeric layer 51 is formed with good precision in such a manner, a second elastomeric layer 52 is laminated on the first elastomeric layer 51 by using the lower core 22 of which the mold surface is covered with the first elastomeric layer 51 formed above, whereby a laminate elastomeric member 54 is prepared. By accommodating the laminate elastomeric member 54 in an aperture member 6, an optical device 7a as shown in FIG. 6A is obtained.

In such an optical device 7a, by harmonizing the deformation characteristics of the first and second elastomeric layers constituting the laminate elastomeric member 54 in combination, desirable deformation characteristics can be obtained as a whole. In such case, for example, it is easy to maintain the exposed surface 51a in a desirable shape such as sphere during deformation of the laminate elastomeric member 54.

Incidentally, it is possible to control a mode of deformation of the exposed surface 51a of the laminate elastomeric member 54 by giving an appropriate distribution to the thickness of the first elastomeric layer 51 along the optical axis h.

The mode of deformation of the laminate elastomeric member 54, similarly as in the case of the monolayer elastomeric member 5, can readily be analyzed according to the finite-element method by using a structural analysis program.

Incidentally, in the formation of a laminate elastomeric member 54 used in the optical device 7a, a first elastomeric layer 51 may be formed in a state wherein the layer 51 alone contacts the side mold 23 as shown in FIG. 8 (wherein a gas passage is not shown). Such a process is preferred in consideration of releasability of a second elastomeric layer 52 from the side mold 23, since it usually shows a larger adhesion than the first elastomeric layer 51.

Hereinabove, embodiments wherein a gas passage is formed in a mold have been described with reference to FIGS. 5A to 8. In the present invention, however, it is possible to inject a gas into the boundary between a mold and an elastomeric member through a gas passage formed in the elastomeric member. Further, a gas passage may be formed in both of a mold and an elastomeric member.

In a case where a gas passage is formed in an elastomeric member, for example, a raw material for an elastomeric member may be poured into a cavity surrounded by a mold, and then cured thereby to form an elastomeric member, while a fitting member such as a pin or wedge is left as it is inserted in the cavity. Thereafter, a gas passage may be formed by removing the fitting member from the elastomeric member.

Further, it is possible to use known molding methods in the field of plastic material such as the injection method, in addition to the above casting method, as a method of forming an elastomeric member 5.

In the present invention, it is preferred to use plural mold cores (e.g., an upper core and a lower core), in order to form an elastomeric member with high precision. Incidentally, in the embodiments shown in FIGS. 1 and 5A to 5C, a circular bottom plate 4 also functions as an upper mold.

The side mold 3 surrounds a mold cavity for forming an elastomeric member 5 in connection with the core 2 or the lower core 92. The holder 1 holds the core 2, and the holder 22a holds the lower core 92. The side mold 3, holder 1 and 22a may comprise metal, resin, etc. However, it is preferred to compose these members of a material showing good releasability from the elastomeric member 5, such as resins including Teflon, metals coated with resins including Teflon, and the like.

In the present invention, a gas is injected into the boundary between the elastomeric member 5 and the core 2 through pores in the core 2, or to the boundary between the elastomeric member 5 and the lower core 92 through the gas passage 91a. As such gas, a material which can be in a gaseous state at a temperature at which the release is effected (usually, at an ordinary temperature) can be used without particular limitation. However, it is desirable to use a gas such as air, nitrogen which hardly reacts on the elastomeric member 5, the core 2, etc., at this temperature.

As a material constituting the elastomeric member 5, natural or synthetic polymer materials showing elastomeric or elastic properties at a temperature at which the optical device 7 is used, may be used without particular limitation. In addition, liquid elastomeric material prepared by dissolving aluminum soap (such as aluminum laurate) in hydrocarbons can be used in the present invention.

As a material constituting the elastomeric member 5, a material having a spectral transmittance of 80% or larger at 350 nm, and that of 92% or larger in a region of 500 to 700 nm is preferably used, in a case where the elastomeric member 5 constitutes a lens. Further such material preferably has an elasticity modulus of $5 \times 10^2$ dyne/cm$^2$ larger and that of $1 \times 10^8$ dyne/cm$^2$ smaller. In a case where plural materials selected from those having an elasticity modulus in the above range (e.g., in a case where two elastomeric layers 51 and 52 constitute a laminate elastomeric member 54), the ratio of elasticity modulus ($E_1$) of the elastomeric layer 51 to the elasticity modulus ($E_2$) of the elastomeric layer 52 (i.e., $E_1/E_2$) is preferably 2 to 10000, while depending on the thickness of respective elastomeric layers.

Further, in a case where the optical device or optical element produced according to the invention is used as a lens, the elastomeric member should preferably have a high transparency to light of at least a wavelength used.

Examples of elastomeric or elastic materials used in the present invention may include:

(a) diene rubber

For example, diene polymers such as one comprising butadiene, isoprene, etc.; diene-vinyl copolymer such as nitrile rubber and acylic rubber.

(b) ethylene copolymer

For example, copolymers comprising ethylene and one or more compounds selected from α-olefin, diene, polar group-monosubstituted vinyl compounds (such as acrylic acids, methacrylic acids, styrene, vinyl chloride, vinyl ether), di-substituted vinyl compounds (such as maleic acid), and the like, and (Crystallinity of ethylene is extremely reduced or substantially removed in these ethylene copolymers).

(c) olefin rubber

For example, polyisobutene, atactic polypropylene, polyvinyl chloride (one mixed with a relatively large amount of plasticizer), copolymers comprising two or more monomers selected from acrylic acid or acrylic acid esters, and copolymers comprising two or more monomers of acrylic acid derivatives (one containing water or a high-boiling solvent).

(d) other rubbers

For example, silicone rubber (dimethylsilicone polymer, diphenyl dimethylsilicone polymer, etc.), and phosphazene polymer.

Elastomeric materials above exemplified may be crosslinked as desired. The elasticity modulus E can be changed by controlling the degree of cross-linking. The crosslinking may be performed by using a cross-linking agent including sulfur, peroxides, etc.

In the present invention, while aforesaid various elastomers may be used as the material constituting the elastomeric member 5, silicone rubber, ethylene-propylene-diene terpolymer, and the like may be particularly preferably used in view of desirable mechanical properties including elasticity modulus, etc., and of desirable optical characteristics including transparency, refractive index, etc.

The thickness, along the optical axis h, of the elastomeric member 5 of materials as described above, while depending on the elasticity modulus E thereof, is ordinarily preferably 0.5 to 50.0 mm, more preferably 1.0 to 30.0 mm. In a case where the elastomeric member 5 has a laminated structure, the above thickness corresponds to total thickness of respective elastomeric layers.

The aperture member 6 housing the above elastomeric member 5 comprises a hollow and bottomless cylindrical member with a circular aperture 6a in the top face thereof, which is, for example, formed from a plate preferably having a thickness of about 0.1 to 10 mm.

The aperture member 6 may comprise a relatively rigid material such as metal, glass, or resin.

Further, the aperture member 6 may preferably comprise an opaque material.

The circular bottom plate 4 sandwiching the elastomeric member 5 between itself and the aperture member 6, may comprise a relatively rigid transparent material including glass, resin, etc., and may preferably have a thickness of about 0.1 to 5 mm.

The optical device 7 comprises the elastomeric member 5, the aperture member 6, and the bottom plate 4, as described above. The optical device 7 may for example be formed, as a whole, in a cylindrical shape as shown in FIG. 3. However, the optical device in the present invention can comprise, e.g., an elastomeric member in the form of a rectangular parallel-piped and an aperture member having a rectangular slit-shaped aperture in the form of a rectangular parallelepiped. The slit-shaped exposed surface of such optical device can function as a cylindrical lens, a toric lens, etc.

Further, the exposed surface 5a of the elastomeric member 5 can be made a reflective surface, e.g., through vapor deposition of metal on the exposed surface. In such an embodiment, a material constituting the elastomeric member is not required to be transparent, and further, fillers such as metal powder may be dispersed in the elastomeric member.

Next, a method of using the optical device 7 produced according to the process of the present invention will be described hereinbelow, with reference to FIGS. 3 and 9.

FIGS. 3 is a sectional view showing the optical device 7 in an initial state (i.e., in a state where the elastomeric member 5 is not deformed).

As shown in FIG. 9, when the elastomeric member 5 is deformed through pressurization by upwardly applying a positive pressure to the bottom plate 4, the exposed surface 5a of the elastomeric member 5 is protruded, through the aperture 6a of the aperture member 6 thereby to form a convex lens in correspondence to the magnitude of the pressure applied. Therefore, by controlling the magnitude of the pressure applied to the elastomeric member 5, the shape of the convex lens of the exposed surface 5a can be changed reversibly whereby a desired focal length can be provided in the optical device 7.

On the other hand, in a case where a negative pressure is applied to the elastomeric member 5, the exposed surface 5a thereof may provide a reversibly variable concave lens (not shown).

The mode of variation of the exposed surface 5a through deformation of the elastomeric member 5 can readily be analyzed, e.g., according to the finite-element method by using a structural analysis program.

Hereinabove, there have been described embodiments of the present invention wherein the optical devices 7 or 7a as shown in FIGS. 3 and 6A are formed. Further, according to the process of the present invention, there may preferably be produced optical devices 7a to 7j having other structures, of which sectional views in a direction of the thickness of elastomeric members are respectively shown in FIGS. 10A to 16C.

FIG. 10A shows an optical device 7b wherein a monolayer elastomeric member 5 having a flat-shaped exposed surface 5a is sandwiched between a circular aperture plate 71 and circular bottom plate 72, and these members are accommodated in a hollow cylindrical side plate 99. FIG. 10B shows a state where the aperture plate 71 is moved along an optical axis h so as to pressurize the elastomeric member 5, and the exposed surface 5a thereof is protruded to form a convex lens.

Figure 11:
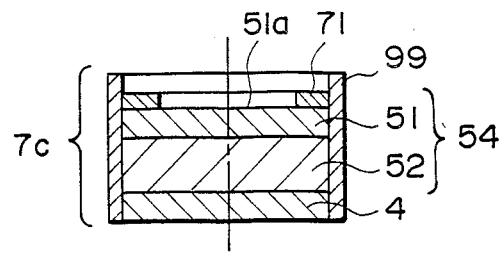

FIG. 11 shows an optical device 7c wherein a laminate elastomeric member 54 having a flat-shaped exposed surface 51a is used in place of the monolayer elastomeric member 5 shown in FIG. 10A. In such an optical device 7c wherein the outer surface of the laminate elastomeric member 54 is restricted by the side plate 99, it is preferred that the ratio of elasticity moduli between a first elastomeric layer 51 and a second elastomeric layer 52 ($E_1/E_2$) is somewhat increased up to about $E_1/E_2 = 100$, in order to deform the laminate elastomeric member 54 while maintaining the exposed surface 51a to be spherical.

Figure 12:
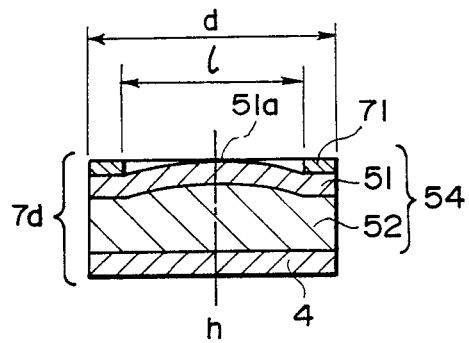

FIG. 12 shows an optical device 7d wherein a laminate elastomeric member 54 is sandwiched between an aperture plate 71 and a bottom plate 4. In the above optical device 7d, a side plate is not provided.

For reference, an example of structural analysis in the above optical device 7d according to the finite-element method will be described hereinbelow.

Thus, the structural analysis is effected under the following provisions:

elasticity moduli of the first and second elastomeric layers 51 and 52: $E_1 = 6 \times 10^5 (N/m^2)$, $E_2 = 1 \times 10^4 (N/m^2)(E_1 E_2 = 60)$, Poisson's ratios of these elastomeric layers: respectively 0.47, thicknesses, along an optical axis h, of the first and second elastomeric layers 51 and 52: respectively $t_1 = 1$ (mm), $t_2 = 4$ (mm), a diameter (d) of the bottom surface of the columnar laminate elastomeric member 54: d = 25 (mm), a diameter (l) of the circular exposed surface 51a: l = 20 (mm), and a shape of the exposed surface 51a and shapes of the first and second elastomeric layers 51 and 52 at the boundary therebetween: respectively, a spherical surface having a curvature radius (or a radius of curvature) of 50 mm.

In a case where the distance (Z) between the aperture plate 71 and the bottom plate 4 of the optical device 7d shown in FIG. 12 is shortened by a distance ΔZ, a mode of deformation of the exposed surface 51a of the laminate elastomeric member 54 is analyzed. This analysis is effected according to a finite-element method by using a structural analysis program, similar as described in "Applied Finite-Element Analysis (written by Larry J. Segerlind, translated by Tadahiko Kawai, published by Maruzen K.K.)".

As a result, in a case of ΔZ = 0.4 mm, a curvature radius of the exposed surface 51a is determined to be about 30.2 mm. In a case where ΔZ is changed in a range of 0–0.4 mm, the shape of the exposed surface 51a is determined to be deformed in a curvature radius range of 50–30.2 mm, while retaining an almost spherical surface. Further a deviation in shape of the exposed surface 51a from that of a spherical surface is determined to be always 10 μm or smaller, corresponding to the above range of $\Delta Z = 0$–$0.4$ mm.

With reference to the above results of structural analysis, in a case where the exposed surface 51a of the optical device 7d is used as a reflective surface (e.g., through vapor deposition thereon), an amount of variation in refractive power of 26 diopter may be obtained corresponding to an amount of variation in Z of 0.4 mm. On the other hand, in a case where the exposed surface 51a is used as a refracting surface, an amount of variation in refractive power of 6.6 diopter may be obtained, when refractive indices of the first and second elastomeric layers are respectively 1.5.

Figure 13:
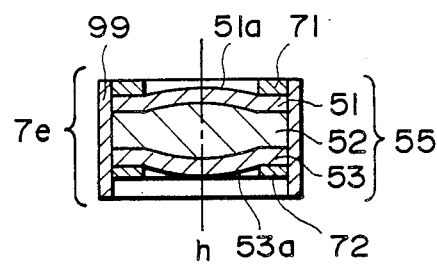

FIG. 13 shows an optical device 7e comprising an elastomeric member 55 which in turn comprises a first elastomeric layer 51 (elasticity modulus: $E_1$), a second elastomeric layer 52 (elasticity modulus $E_2$), and a third elastomeric layer 53 (elasticity modulus: $E_3$) laminated in that order from the upper side (i.e., the side of an exposed surface 51a) along an optical axis h; and plural aperture plates (71 and 72). In the optical device 7e, it is required to satisfy such relations $E_1 > E_2$ and $E_3 > E_2$, but $E_1$ may be equal to or different from $E_3$. Further, at least one of aperture plates 71 and 72 is disposed movably along a side plate 99.

Figure 14:
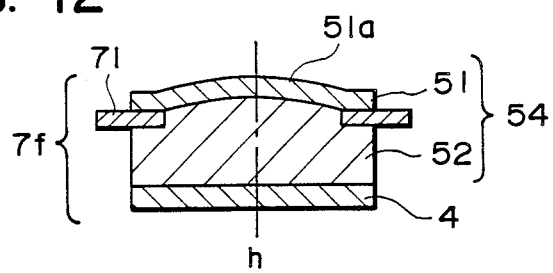

FIG. 14 shows an optical device 7f wherein an aperture plate 71, being adhered to first and second elastomeric layers, is disposed in a laminate elastomeric member 54 so as to contact the surface of the second elastomeric layer 52.

Figure 15:
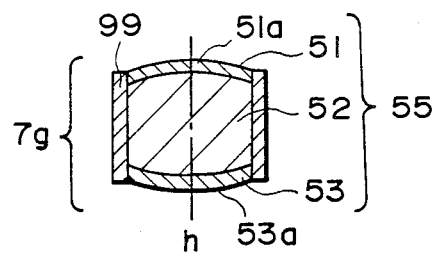

FIG. 15 shows an optical device 7g wherein a columnar laminate elastomeric member 55 is encased in a cylindrical side plate 99 comprising a piezoelectric element. By controlling a voltage applied to the side plate 99, the inside diameter of the side plate 99 may be changed, thereby to deform the laminate elastomeric member 55.

FIGS. 16A, 16B and 16C show optical devices 7h, 7i and 7j, respectively, wherein a laminate elastomeric member 54 is used in combination with a bottom plate 4a comprising an inelastic material and having an optically effective surface. Since the laminate elastomeric member 54 used in these optical devices 7h and 7i have relatively complicated structures, it is required to form such elastomeric member 54 with particular high precision in order to obtain desired optical characteristics.

Referring to FIG. 16A, the laminate elastomeric member 54 is sandwiched between an aperture plate 71 and the bottom plate 4a comprising a transparent inelastic material such as glass, resin, and the like. It is preferred to bond a first elastomeric layer 51 to the aperture plate 71, e.g., by an adhesive.

An optical device having various optical characteristics may be produced according to the process of the present invention, by appropriately changing the shape of the bottom plate 4a, or by combining it with the shape of the laminate elastomeric member 54, as desired. For example, in addition to the optical device 7h formed into the shape of a meniscus lens as a whole (FIG. 16A), an optical device 7i formed into the shape of a biconvex lens as a whole (FIG. 16B), an optical device 7j formed into the shape of a biconcave lens as a whole (FIG. 16C), and the like may be preferably produced.

In the above embodiments wherein an elastomeric member has a laminate structure, plural mold cores (e.g., the upper core 21 and the lower core 22 as shown in FIG. 6B) are used when the first elastomeric layer 51 is formed. An objective of this is to precisely form not only a surface on the side of the exposed surface 51a but also another surface confronting the second elastomeric layer 52, of the first elastomeric layer 51 having a relatively large elasticity modulus.

The shape of the exposed surface 51a side of the first elastomeric layer 51 is required to be formed with high precision since it exerts a great influence on the optical characteristics. However, it is sometimes sufficient in view of desired optical characteristics that the shape on the second elastomeric layer 52 side of the first elastomeric layer 51 is formed with somewhat lower precision (e.g., in a case where the difference in refractive indices between the first and second elastomeric layers is relatively small).

Particularly, in a case where the first and second elastomeric layers 51 and 52 comprise similar or the same type of materials having a difference only in elasticity moduli thereof (e.g., in a case where both of these elastomeric layers comprise silicone rubber), the difference in refractive index between the first and second elastomeric layers may be negligibly small. Accordingly, in such a case, the precision required in formation of the first elastomeric layer 51 may be somewhat lower, with respect to the thickness of the first elastomeric layer 51, or to the shape on the second elastomeric layer side thereof, etc.

In such case, a relatively simple forming method without using plural molds (or cores) may be used in place of the first step (i.e., a step wherein the first elastomeric layer 51 is formed by using a mold) of the above described embodiment.

Such relatively simple methods may include: (a) spin casting method (b) spinner coating method (c) spraying or dipping method, etc.

Hereinbelow, outlines of such respective simple forming method will be described.

(a) Spin casting method

For example, a liquid raw material for a first elastomeric layer 51 is poured into a mold having a prescribed shape. Thereafter, while giving a desired shape to the surface of the liquid raw material, the raw material may be cured or hardened, e.g., on heating thereby to form a first elastomeric layer.

(b) Spinner coating method

For example, a raw material has a first elastomeric layer 51 having a relatively large viscosity is applied to a mold having a prescribed shape by means of a spinner coater thereby to form a layer of a desired thickness. Thereafter, the raw material may be cured or hardened, e.g., on heating thereby to form a first elastomeric layer 51.

(c) Spraying or dipping method

For example, a raw material for a first elastomeric layer 51 is formed into a varnish capable of forming a film with a uniform thickness, and then the varnish is applied to a mold having a prescribed shape by spraying or dipping, etc., thereby to form a layer of desired thickness. Thereafter, the raw material may be cured or hardened, e.g., on heating thereby to form a first elastomeric layer 51.

After the first elastomeric layer 51 is formed by the above spin casting method, spinner coating method, or spraying or dipping method, etc., the resultant mold covered with the first elastomeric layer 51, as such, may be used as a lower core 22 shown in FIG. 6D. Then, a second elastomeric layer 52 may be laminated on the first elastomeric layer 51 in a similar manner as shown in FIG. 6D or below, thereby to obtain an optical device 7a.

In the above embodiment, the first elastomeric layer 51 previously formed is used as a part of a mold, and the second elastomeric layer 52 is laminated thereon by forming the second elastomeric layer 52 directly on the first elastomeric layer 51, thereby to prepare a laminate elastomeric member. In the present invention, however, it is possible that a second elastomeric layer may be formed, e.g, according to the casting method, separately from a first elastomeric layer 51, and thereafter the resultant second elastomeric layer 52 may be superposed on the first elastomeric layer 51 thereby to prepare a laminate elastomeric member.

Hereinbelow, the present invention will be explained in further detail with reference to a specific example of preparation of a variable-focus optical device.

EXAMPLE 1

Referring to FIG. 17, there was provided a holder 1 for encasing a core, having the shape of a body of revolution, in which a gas passage 1a was formed. The holder 1 comprised a stainless steel and had an outer diameter of 25 mm at the side confronting an elastomeric member 5.

Then, a columnar core (or mold core) 2 having a bottom surface of 20 mm in diameter was adhered to the above holder 1, and these members 1 and 2 were formed in a body. The core 2 comprised a porous material of Corning VYCOR Glass 7930 (pore diameter at a mold surface: about 40 Å, mfd. by Corning Glass Works), and had a concave mold surface with a curvature radius of 50 mm.

In this step, a gap 1b capable of passing a gass therethrough was provided over the bottom surface (opposite to the mold surface) of the core 2.

Further, a circular bottom plate 4 of a transparent glass having a thickness of 5.0 mm was disposed to confront the core 2 with a spacing of 10.0 mm along an optical axis h.

Furthermore, a hollow cylindrical side mold 3 of tetrafluoroethylene (TEFLON) (an inner diameter of 25 mm) was disposed to contact the outer surface of the holder 1. The side mold 3 comprised cylindrical Teflon frames 3a and 3b, and was capable of splitting. The tetrafluoroethylene (TEFLON) frame 3a could be further split into three pieces along its circumference.

The glass bottom plate 4 and the tetrafluoroethylene (TEFLON) frame 3a were closely bound to each other in a vertical direction of FIG. 17, by means of a rubber band (not shown) comprising a material of large elasticity modulus.

Into a mold cavity surrounded by the core 2 (and further the holder 1), the glass bottom plate 4, and the side mold 3, respectively disposed above, a raw material for an elastomeric member was poured through an inlet 9 formed in the tetrafluoroethylene (TEFLON) frame 3a. The raw material comprised 10 wt. parts of Silicone rubber KE 104 Gel (mfd. by Shinetsu Kagaku Kogyo K.K.) and 1 wt. part of curing agent CATALYST 104 (mfd. by Shinetsu Kagaku Kogyo K.K.).

Thereafter, the above raw material was cured by leaving it for about 4 hours in a thermostat of 80° C., thereby to form a columnar elastomeric layer 5.

Then, by injecting an air (pressure: 7 kg/cm²) through an conduit 1a formed in the holder 1, the air was caused to penetrate through fine pores in the porous core 2, and was supplied to the boundary between the core 2 and the cured elastomeric member 5, whereby the elastomeric member 5 was so released from the core 2 as to be floated thereabove.

The above release was effected in such a manner that the stainless holder 1 and the tetrafluoroethylene (TEFLON) frame 3b, in combination with the core 2, were released from the elastomeric member 5, and that the tetrafluoroethylene (TEFLON) frame 3a (capable of splitting into three pieces) and the bottom plate 4 remained closely contacting the elastomeric member 5.

Further, the tetrafluoroethylene (TEFLON) frame 3a was separated from the elastomeric member 5 while being split into, three pieces, whereby the elastomeric member 5 having an optical surface with high precision was prepared in a state of closely contacting the glass bottom plate 4 as shown in FIG. 2. The elastomeric member 5 had a surface, on the side contacting the bottom plate 4, with a diameter of 25 mm, and had a thickness of 10.0 mm along an optical axis h.

The thus prepared elastomeric member 5 and bottom plate 4 were housed in an aperture member 6 having an aperture 6a with an inner diameter of 20 mm, thereby to obtain a variable-focus optical device 7 as shown in FIG. 3.

An external force was upwardly applied to a peripheral portion (a portion through which light beam would not pass) whereby the elastomeric member 5 was deformed in the direction corresponding to pressurization thereof. As a result, the curvature radius of the exposed surface 5a of the elastomeric member 5 was reversibly and continuously changed from 50 mm (initial value) to 30 mm.

EXAMPLE 2

Referring to FIG. 6B, a columnar upper core 21, a columnar lower core 22, and a hollow cylindrical side mold 3, as described hereinbelow, were provided first of all.

The upper core 21 of brass had a mold surface (i.e., a surface contacting a first elastomeric layer 51) coated with tetrafluoroethylene (TEFLON) and having a portion shaped into a convex spherical surface (curvature radius: 50 mm, diameter l of the convex portion: 20mm). The upper core 21 had a columnar shape with a diameter (d) of 25 mm.

On the other hand, the columnar lower core 22 of brass had a concave spherical portion (curvature radius: 50 mm) on the mold surface thereof, and had a diameter (d) of 25 mm. Further, the side mold 23 of brass had an inner diameter of 25 mm.

Separately, there was prepared a mixture comprising 100 parts of silicone rubber (trade name: KE 106, mfd. by Shinetsu Kagaku Kogyo K.K.) and 10 parts of a curing agent (trade name CATALYST RG, mfd. by Shinetsu Kagaku Kogyo K.K.) through addition and mixing, degassing under a vacuum.

The above mixture was poured into a mold cavity surrounded by the upper core 21, the lower core 22, and the side mold 23, and then the mixture was cured through standing for 4 hours at 65° C. thereby to form a transparent first elastomeric layer 51 having an elasticity modulus $E_1$ of about $1.2 \times 10^5 N/m^2$, and a thickness $t_1$ of 1 mm along the optical axis h.

As shown in FIG. 6C, the upper core 21 was removed from the cured first elastomeric layer 51. Thereafter, as shown in FIG. 6D, a circular bottom plate 4 (thickness: 3 mm) of a transparent glass having a diameter (k) of 28 mm is disposed on an upper portion (i.e., the portion from which the upper core 21 had been removed) of the side mold 23 so that the bottom plate 4 and the above prepared first elastomeric layer 51 formed a prescribed cavity.

Separately, there was prepared a mixture comprising 10 wt. parts of silicone rubber (trade name: KE 104 Gel, mfd. by Shinetsu Kagaku Kogyo K.K.) and 1 part of a curing agent (trade name: CATALYST 104, mfd. by Shinetsu Kagaku Kogyo K.K.) through addition and mixing, degassing under a vacuum.

The above mixture was poured into the cavity surrounded by the lower core 22, the side mold 23 and the bottom plate 4, and then the mixture was cured through standing for 72 hours at 40° C.

As a result, a transparent second elastomeric layer 52 having an elasticity modulus $E_2$ of about $2 \times 10^3$ N/m$^2$, and a thickness of 4 mm along the optical axis h was formed on the first elastomeric layer 51 previously formed, thereby to prepare a laminate elastomeric member 54.

The thus prepared laminate elastomeric member 54 was housed, as shown in FIG. 6A, in a cylindrical aperture member 6 having an aperture with a diameter of 20 mm thereby to obtain an optical device 7a.

By using the optical device 7a, a change in the shape of the exposed surface 51a of the laminate elastomeric member 54 was measured while the glass bottom plate 4 was moved along the optical axis h. The glass bottom plate 4 was moved in the direction corresponding to pressurization of the elastomeric member 54 by a distance of 0–0.4 mm along the optical axis h. As a result, the shape of the exposed surface 51a of the laminate elastomeric member 54 was deformed reversibly and continuously while retaining an almost spherical surface with a curvature radius in the range of 50–35 mm.

EXAMPLE 3

A similar silicone rubber mixture as used for the raw material of the first elastomeric layer in Example 2 was used.

The above mixture was applied to the mold surface (the surface having the concave spherical shape) of the lower core 22 used in Example 2 by means of a spinner coater. Thereafter, the mixture was cured through standing for 30 min. at 150° C., whereby a first elastomeric layer 51 having a thickness of 0.1 mm along an optical axis h was formed on the lower core 22.

Then, the above lower core 22 was disposed in the side mold 23 used in Example 2, as shown in FIG. 6C. Thereafter, an optical device was prepared according to a similar process as in Example 2.

EXAMPLE 4

A silicone varnish (trade name: PERGUM Z, mfd. by Dow Corning Co.) was applied to the mold surface of the lower core 22 used in Example 2 through dipping. Then, the silicone varnish was cured through standing for 20 hours at 20° C., whereby a first elastomeric layer 51 having a thickness of 0.1 mm along an optical axis h was formed on the lower core 22.

Then, the above lower core 22 was disposed in the side mold 23 used in Example 2, as shown in FIG. 6C. Thereafter, an optical device was prepared according to the same process as in Example 2 except that there was used a silicone rubber mixture comprising 100 parts of silicone rubber (trade name: KE 104 Gel, mfd. by Shinetsu Kagaku Kogyo K.K.) and 10 parts of a curing agent (trade name: CATALYST 104, mfd. by Shinetsu Kagaku Kogyo K.K.) through addition and mixing, degassing under a vacuum and that this mixture was cured through standing for 72 hours at 40° C.

As described hereinabove, according to the process of the present invention, an optical molding is formed by using a mold, and thereafter the optical molding is so released from the mold as to float above the mold thereby to prepare an optical element.

Therefore, according to the present invention, no localized force is applied to the optical molding, and therefore, undesirable deformation or flaws thereof are not caused.

Particularly, even in a case where an optical element comprises an elastomeric or elastic material, according to the present invention, deformation of the optical surface of such an optical molding due to thermal expansion or shrinkage, or to absorption of ultrasonic vibration is removed, thereby to particularly preferably effect the release smoothly and surely.

What is claimed is:

1. A process for producing an optical element utilizing a rigid holder, which comprises the steps of:

pouring an uncured optical raw material into said holder having a rigid mold surface to form said optical element in contact with the mold surface, and a porous material insert as part of the rigid mold surface, said porous material insert having a shape-defining rigidity;

curing said optical raw material to thereby form said optical element in substantial contact with said mold surface; and supplying a gas through said porous material to a boundary between the optical element and the mold surface to thereby release the optical element from the mold.

2. A process according to claim 1, wherein said optical element comprises an elastomeric material.

3. A process according to claim 2, wherein the gas is supplied to the boundary through a gas passage formed in at least on of said mold and said optical molding.

4. A process according to claim 3, wherein the gas is supplied from a bottom surface of the mold, opposite to the mold surface, and the pressure of the gas is 1 to 50 atm. gauge at the bottom surface.

5. A process according to claim 4, wherein the pressure of the gas is 5 to 20 atm. gauge.

6. A process according to claim 2, wherein said optical element comprises a first elastomeric layer having a relatively large elasticity modulus, and a second elastomeric layer having a relatively small elasticity modulus disposed thereon.

7. A process according to claim 1, wherein the gas permeability of the mold is $5 \times 10^8$ mol/(cm$^2$·cmHg·min) or larger at a pressure difference of 5 kg/cm$^2$ or above across the mold.

8. A process according to claim 1, wherein the gas is supplied from a bottom surface of said mold, opposite to the mold surface, and the pressure of the gas is 1 to 20 kg/cm$^2$ gauge at the bottom surface.

9. A process according to claim 1, wherein the gas supplied through the porous material is applied at a substantially uniform pressure throughout the porous material.

10. A process for producing an optical element utilizing a rigid holder which comprises the steps of:

providing a holder having a rigid mold surface, a portion of said mold surface further including a porous material insert having shape-defining rigidity;

disposing a film on at least a portion of said mold surface by applying negative air pressure through said porous material;

pouring an uncured optical raw material into said holder having a rigid mold surface to form said optical element in contact with the mold surface and the film;

curing said optical raw material to thereby form said optical element in substantial contact with said mold surface and said film; and removing the negative air pressure through said porous material thereby release the optical element from the mold.

11. A process according to claim 10, wherein the film has a thickness of 0.1 to 5.0 μm.

12. A process according to claim 10, wherein the film comprises a polymer selected from the group consisting of polyethylene, polyimide, polyacrylonitrile and polyvinylidene chloride.

13. A process for producing an optical device comprising plural elastomeric layers of different elasticity moduli disposed along an optical axis, and an aperture member having an aperture and contacting at least one of the plural elastomeric layers, the process comprising the steps of:

forming a first elastomeric layer having an elasticity modulus $E1$;

forming a second elastomeric layer having an elasticity modulus $E2$ on the first elastomeric layer wherein said elasticity modulus $E2$ is less than said elasticity modulus $E1$; and disposing the aperture member so that it contacts at least one of the plural elastomeric layers.

14. A process according to claim 13, wherein the laminate elastomeric member is prepared by the steps of:

forming the first elastomeric layer between two molds, separating one of the two molds from the first elastomeric layer to expose a surface of the first elastomeric layer, forming the second elastomeric layer on the exposed surface of the first elastomeric layer, and separating the other mold contacting the first elastomeric layer from the first elastomeric layer.

15. A process according to claim 13, wherein the laminate elastomeric member is prepared by the steps of:

applying a liquid raw material for the first elastomeric layer to a surface of a mold thereby to form a coating layer of the raw material, hardening the coating layer to form the first elastomeric layer, forming a second elastomeric layer on a surface of the first elastomeric layer, opposite to the surface thereof contacting the mold, and separating the mold from the first elastomeric layer.

* * * * *

UNITED STATES PATENT AND TRADEMARK OFFICE
CERTIFICATE OF CORRECTION

PATENT NO. : 4,985,186
DATED : January 15, 1991
INVENTOR(S) : NORIYUKI NOSE ET AL.   Page 1 of 2

It is certified that error appears in the above-identified patent and that said Letters Patent is hereby corrected as shown below:

COLUMN 8

Line 7, "is" should read --with--.

COLUMN 9

Line 30, "aperture member (6)" should read --aperture member 6)--.
Line 38, "$2 \leq t_1+t_2 23\ 30.$" should read --$2 \leq t_1+t_2 \leq 30.$--.

COLUMN 12

Line 12, "$dyne/cm^2$ larger" should read --$dyne/cm^2$ or larger-- and "$dyne/cm^2$ smaller" should read --$dyne/cm^2$ or smaller--.
Line 37, "like, and" should read --like.--.

COLUMN 13

Line 41, "FIGS. 3" should read --FIG. 3--.
COL.16, Line 46, "has" should read --having--.

COLUMN 17

Line 23, "comprised a" should read --was comprised of--.

Line 65, "an" should be deleted.

COLUMN 18

Line 13, "into," should read --into--.

UNITED STATES PATENT AND TRADEMARK OFFICE
CERTIFICATE OF CORRECTION

PATENT NO. : 4,985,186
DATED : January 15, 1991
INVENTOR(S) : NORIYUKI NOSE ET AL.       Page 2 of 2

It is certified that error appears in the above-identified patent and that said Letters Patent is hereby corrected as shown below:

COLUMN 20

Line 41, "on" should read --one--.

COLUMN 21

Line 15, "material thereby" should read
          --material to thereby--.

COLUMN 22

Line 8, "laminate" should be deleted.
    Line 20, "laminate" should be deleted.

Signed and Sealed this

Thirteenth Day of October, 1992

Attest:

DOUGLAS B. COMER

Attesting Officer      Acting Commissioner of Patents and Trademarks